No. 823,927. PATENTED JUNE 19, 1906.
M. C. CLARK.
MACHINE FOR MANUFACTURING FOOTWEAR.
APPLICATION FILED OCT. 18, 1905.
6 SHEETS—SHEET 4.

Fig. 5

No. 823,927. PATENTED JUNE 19, 1906.
M. C. CLARK.
MACHINE FOR MANUFACTURING FOOTWEAR.
APPLICATION FILED OCT. 18, 1905.

UNITED STATES PATENT OFFICE.

MAURICE C. CLARK, OF PROVIDENCE, RHODE ISLAND, ASSIGNOR TO MARVEL RUBBER COMPANY, A CORPORATION OF RHODE ISLAND.

MACHINE FOR MANUFACTURING FOOTWEAR.

No. 823,927.  Specification of Letters Patent.  Patented June 19, 1906.

Application filed October 18, 1905. Serial No. 283,199.

*To all whom it may concern:*

Be it known that I, MAURICE C. CLARK, a citizen of the United States, and a resident of Providence, in the county of Providence and State of Rhode Island, have invented certain new and useful Improvements in Machines for Manufacturing Footwear, of which the following is a specification.

This invention relates to a machine for manufacturing footwear, and has particular application to a mechanism adapted for use in the manufacture of rubber footwear.

My invention consists in the construction, combination, and arrangement of parts set forth in and falling within the scope of the appended claims.

While I have in the present instance shown and described a desired embodiment of my invention, I wish it to be understood that I do not confine myself to all the precise details of construction and arrangement set forth, as there may be modification and variation in some respects without departing from the spirit of the invention or exceeding the scope of the claims.

In the accompanying drawings, wherein I have shown an embodiment of one form of the invention, like characters of reference indicate like parts in all the views.

Referring now to the accompanying drawings in detail, the letter A indicates the frame of the machine, which is constructed in any suitable manner.

The numeral 1 is a last conforming to the ordinary rubber shoe, while 2 and 3 are the side-mold parts, and 4 is a sole-mold part of a conformation adapted to mold the exterior of such shoe.

The steam-chambers for imparting vulcanizing heat to the side-mold parts are indicated by 5 and 6, while 7 is a steam-chamber for heating the sole-mold part. These steam-chambers are provided with the necessary steam-fittings for the circulation of steam and which may be of any suitable construction as the occasion may demand.

In the present instance the manner of supporting and operating the side-mold parts 2 and 3 and their steam-chambers 5 and 6 is substantially as follows: Supported from the bed of the machine is a relatively large post 8, (shown in detail in Fig. 7,) said post having a thickened upper portion 9, acting and serving substantially as a pintle for the hinging of the side molds, one of said side molds having a centrally-apertured lug, as at 10, adapted to be inserted between the separated bored lugs of the other side mold in the manner of an ordinary door-hinge, the enlarged portion 9 passing through the bore of said lugs and acting as the pintle of an ordinary hinge. Surmounting this enlarged portion 9 of the post and formed integral therewith is the bearing member 12, having uprights $12^a\ 12^a$ for the support of the trunnion 13, on which rocks the top mold 4. From this construction it will be noted that the three molds are all hinged to a common post and move with such post as a center, thus enabling me to obtain a very compact, powerful, and economical arrangement.

Figure 1:
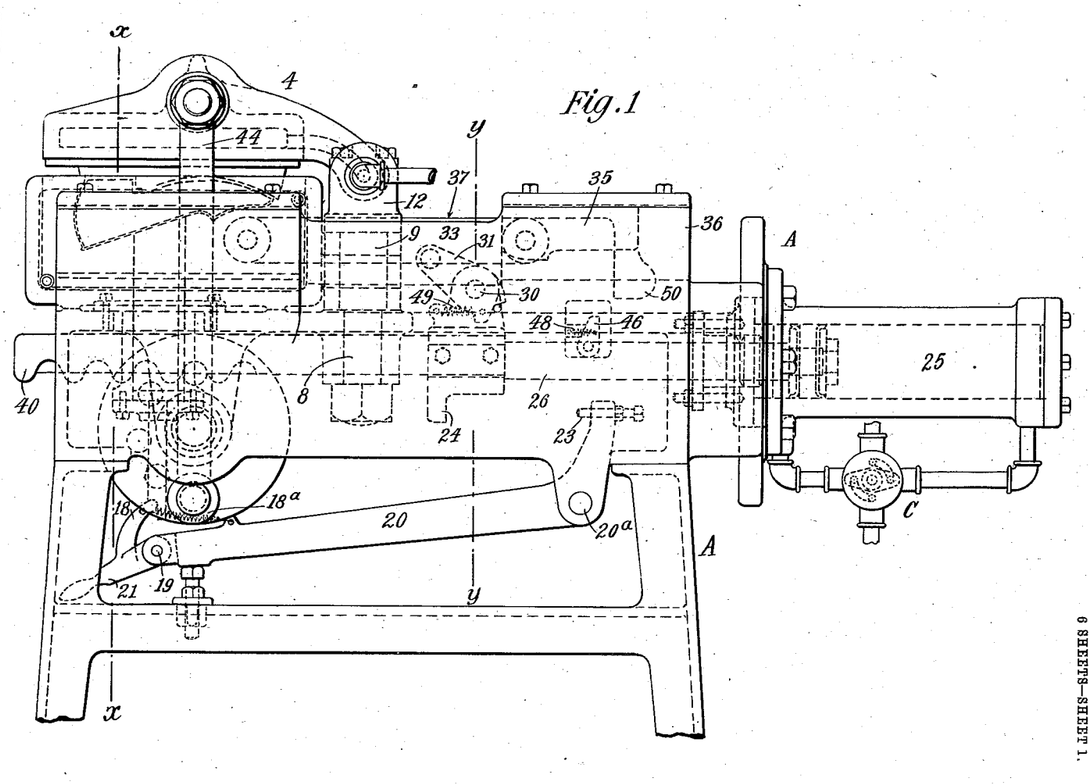
Figure 1 is a view in side elevation of the machine containing the principles of my invention.
Figure 2:
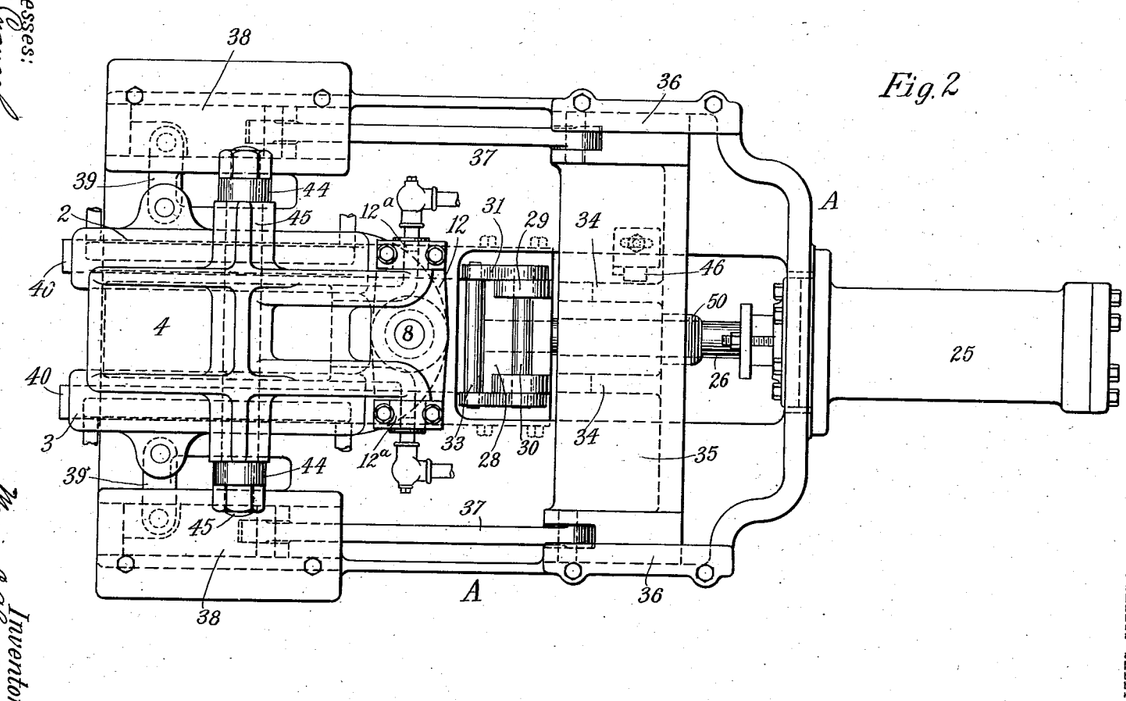
Fig. 2 is a plan view of the same.
Figure 3:
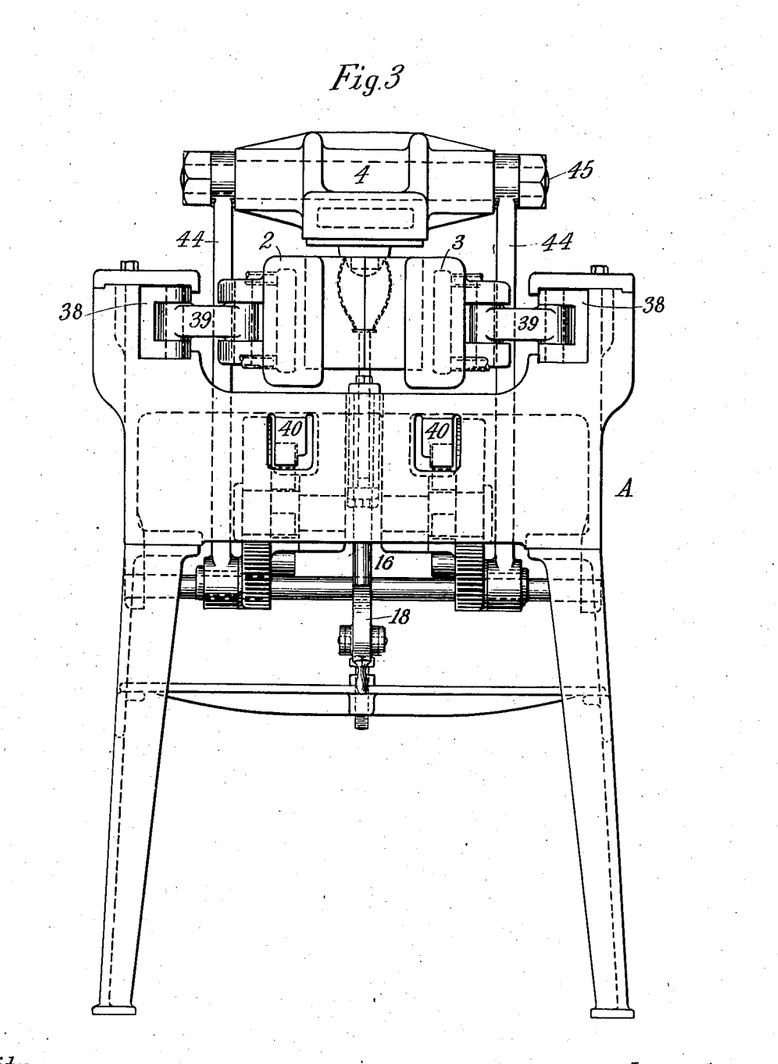
Fig. 3 is a view in front elevation.
Figures 4, 7:
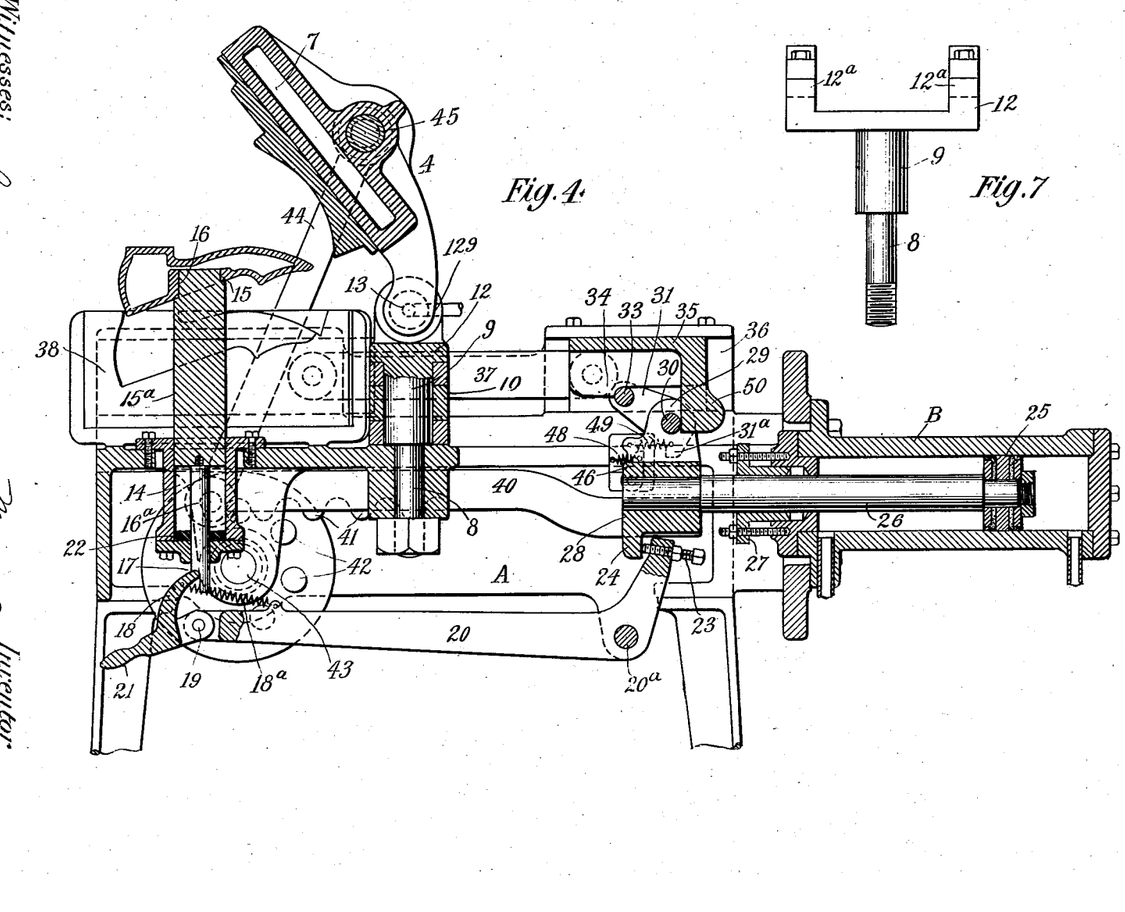
Fig. 4 is a longitudinal view, partly in elevation and partly in section, with the side molds and the sole or top molds partially open.
Figure 5:
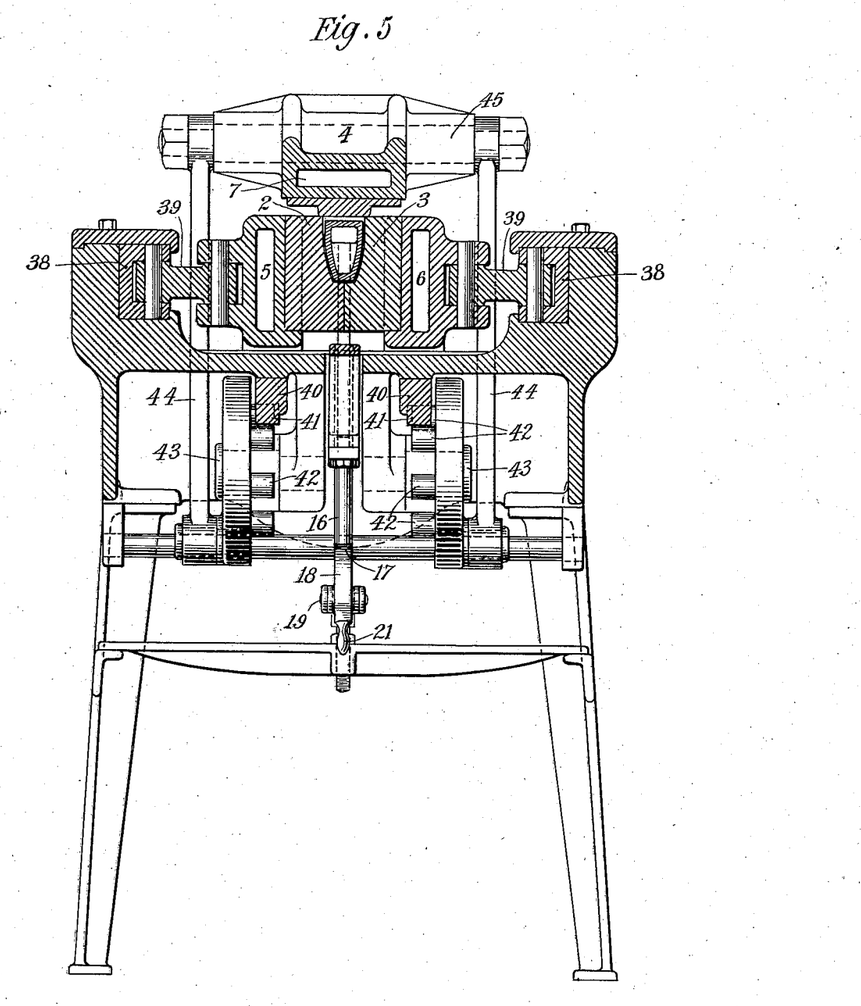
Fig. 5 is a cross-sectional view of the machine, showing the molds in a closed position, such view being taken on the line $x\,x$ of Fig. 1.

The last 1, heretofore referred to and which is designed to hold the shoe during the process of molding and vulcanizing, is supported and operated in the following manner: Within the frame of the machine is mounted the chamber 14, preferably rectangular in cross-section, and within said chamber is adapted to travel the vertically-reciprocating post $15^a$, having at its upper end the last 1. In order that lasts of different sizes and shapes may be employed in connection with this machine to enable shoes of various shapes and sizes to be made thereby, I have constructed the top of the post as is shown in Fig. 4—that is to say, the last is removably mounted on the reduced end 15, such reduced end fitting into a socket 16, formed in the last.

Heretofore in machines of this character it has been customary to rigidly and permanently secure the last to the frame, and the advantages incident to the arrangement I have devised will be obvious, as the last with the shoe thereon may be removed and another substituted, so that a saving of both time and labor is accomplished. To the lower end of the post 14 is secured the stem 16$^a$, which projects downward through an opening formed in the bottom of the chamber, the portion of the stem outside said chamber having a shouldered part 17, adapted to be engaged by the pawl 18, which is pivoted, as at 19, to the lever 20, said pawl having a handle 21 by means of which the pawl may be moved out of engagement with the shouldered portion, thereby permitting the lowering of the post and the last. As the pawl is pivoted to the lever 20, it is desirable to have some tension means for holding it firmly when in engagement with the stem, and to this end I provide a suitable contraction-spring 18$^a$, connecting the pawl and the lever.

Within the chamber and at the bottom thereof I provide a cushion 22, of any suitable or elastic nature, the purpose of which, briefly recited, is as follows: When the post carrying the last is lowered prior to the closing of the side molds around the shoe, it is desirable that the bottom of the last and shoe which in the machine is uppermost, as will be clearly seen in Fig. 4, should project a slight distance above the top edge of the side molds, so that when such molds are brought together the portion of the shoe around the edge will be firmly pressed by the side molds, while the upper portion of the vamp or the instep will be free from pressure. With the closing of the top mold, however, applying, as it does, a direct downward pressure, the post, with the last and shoe, will be depressed until such shoe occupies its final position within the molds and pressure is had entirely around the surface of the shoe, the cushion compressing under the pressure exerted by the top mold and permitting the post to be depressed. The reason that pressure is not primarily placed upon the instep at the time of the closing of the side molds or at the same time as it is applied around the edge of the shoe is that it has been found that when pressure was applied simultaneously to parts of the shoe and especially to the instep by the closing of the side molds the tendency has been for the material of the shoe to be pinched at the instep by the molds, so that the shoe is creased and damaged by the pinching and puckering of the material and the lining of the shoe; but if pressure be not applied to the instep until the top mold is brought down this is obviated and a perfect shoe is obtained. This manner of mounting the last forms an important feature of the present invention.

Figure 6:
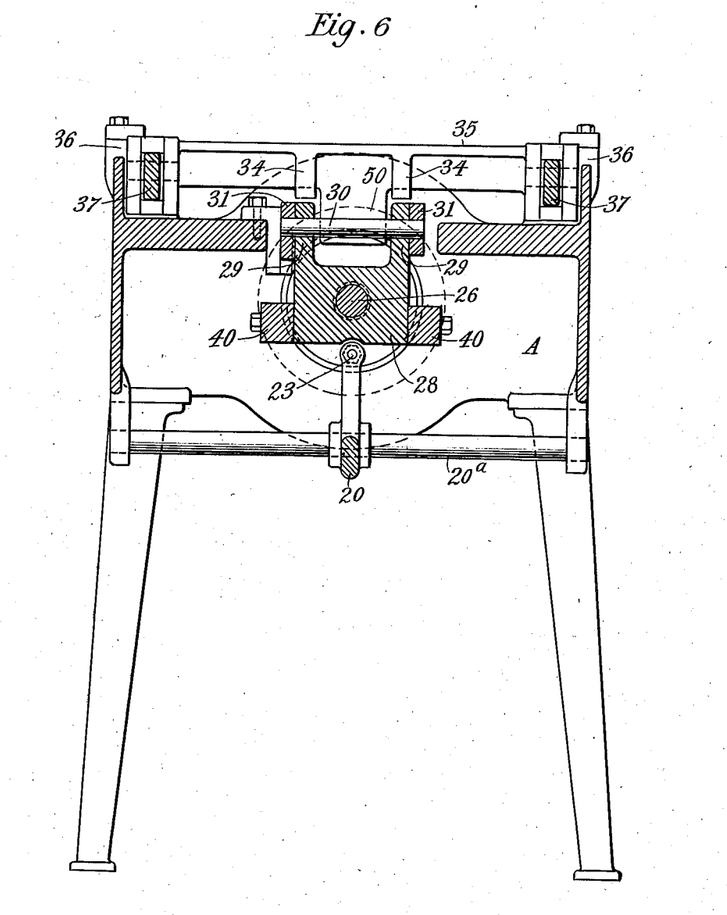
Fig. 6 is a cross-sectional view taken on the line $y\,y$ of Fig. 1, such view showing in section the lower cross-head which actuates the racks for operating the sole or top mold, and also shows the roller and its adjacent parts employed in the actuation of the upper cross-head.

The construction and operation of the side molds of the machine are as follows:

B indicates a motor of any suitable character, preferably a hydraulic motor having a piston 25, the rod 26 of which projects through a stuffing-box 27 at the forward end of the motor-cylinder and is connected with the lower cross-head 28. This latter is adapted to have a reciprocating movement longitudinally of the machine imparted thereto by the reciprocation of the piston. On the upper portion of this cross-head I have arranged lugs 29 29, spaced apart and bored to receive the shaft 30, which carries short trip-arms 31, loosely mounted on such shaft, said arms supporting at their outer ends the roller 33, adapted during the forward travel of the cross-head to contact with the depending ribs 34 34 of the upper cross-head 35 and imparting a forward movement to such upper cross-head. The position of the ribs 34 34 of the upper cross-head is clearly shown in Fig. 6. This upper cross-head 33 extends transversely of the machine and is mounted to slide in guideways formed by the side members 36 36 of the frame of the machine. Through the medium of the long link members 37 37 I connect this upper portion to sliding blocks 38 38, arranged at opposite sides of the machine, each of said sliding blocks being operatively and pivotally connected to the steam-chamber portion of an adjacent side mold by means of a short coupling-link, as at 39, so that when the sliding blocks are reciprocated by the forward and rearward movement of the upper cross-head the side molds will be moved and closed around the last 1, said molds swinging, as heretofore described, around the enlarged portion 9 of the central post 8 as a pivot.

Assuming the side molds to be opened with the upper cross-head in the position at the rear of the machine in order to close such molds, power is imparted to the piston to thrust the same forward, which will cause the lower cross-head to also move forward and through the connections above described the upper cross-head will travel toward the front of the machine operating the long links, the sliding blocks, and the short links to close the side molds snugly around the edge of the shoe, the upper portion of the vamp or the instep of the shoe, however, being free from the pressure of the molds by reason of the slight elevation of the last before described. At this period it is desired that the top mold be closed, and this is accomplished in the following manner: To the lower cross-head I rigidly connect a pair of rack-bars 40, one at each side of the machine, the teeth 41 of said bars engaging with pins or lugs 42, extending from the side of adjacent crank-disks, there being two of such disks, each turning on a short stud-shaft 43, journaled in the bed of the machine. As the lower cross-head is thrust forward by the piston the rack-bars engaging with the pins of the disk rotate the latter. Eccentrically secured to the disk wheels are the connecting-rods 44, which are also secured to the shaft 45, extending through the wall of the upper steam-chamber, so that through this connecting-rod movement is transmitted from the rotating disk wheels to the upper mold, and as the racks move forward the upper mold is brought downward into contact with the shoe on the last. As the upper mold contacts with the shoe, the last and its post are depressed by the yielding of the cushion within the chamber of the last-post, and the upper vamp portion or instep of the shoe is snugly and smoothly forced into its final molding and vulcanizing position within the mold. It will of course be evident that in the present machine the side molds are closed about the shoe at a relatively earlier period than the top mold and it is therefore desirable that when the side molds have reached their closed position that movement of the same be stayed so that such molds will be stationary, while the movement of the top mold is continued to bring it to its final position. To accomplish this staying of the movement of the side molds, it is necessary that they be disengaged from connection with the motor, and this is accomplished as follows: When the side molds have been brought to their closed position, the top molds still being open, the roller 33 is moved or tripped out of engagement with the lugs 34 of the upper cross-head by the heel 31ª of the pivoted arm 31 striking the stop 46, attached to the bed of the machine at a predetermined point. The upper cross-head then being disconnected from the lower cross-head will remain stationary, and consequently motion will cease to be imparted to the side molds, while the piston of the motor continuing its forward movement causes the closing of the top mold through the train of mechanism heretofore described.

After the proper molding and vulcanizing of the shoe has been completed the opening of the top and side molds takes place as follows: The direction of the piston or the motor is reversed, and the rack-arms being retracted reverse the direction of the rotation of the pin-carrying disk wheels, which causes the connecting-rods between the wheel and the top mold to be pushed or forced upward, thus elevating such top mold. As the retraction of the piston continues the central portion of the shaft 30 on the lower cross-head contacts with the depending plate 50 at the rear of the upper cross-head and pulls such upper cross-head back toward the rear of the machine to its original position. The spring 48 holds the stop 46 and permits the latter to be depressed to allow the passing of the heel 31ª, such spring then returning the stop to its normal position. The spring 49, connecting the arm 31ª, tends to elevate the roller and throw the same into position for contact with the upper cross-head on the next forward movement. When the top mold is almost completely opened and the piston has nearly reached the limit of its retracting stroke, the projection 24 on the lower cross-head strikes the adjustable screw 23 in the heel 22 of the lever 20 and swings the forward part of such lever upward around the point 20ª as a fulcrum, and as the dog or pawl 18 is in engagement with the notch of the stem 14 the post and last will be thrust upward, and the completed shoe may then be removed.

In the present construction I have shown a hydraulic motor for operating the molds, the connections of such molds being indicated as a whole by the letter C. It will be understood, however, that any suitable motor may be used for actuating the mechanisms moving the molds.

Having thus described my invention, what I claim, and desire to secure by Letters Patent, is—

1. In a machine of the class described the combination with a frame, of a last carried thereby, a support, and side molds, and a top mold hinged to said support.

2. In a machine of the class described the combination with a frame, of a last carried thereby, a support, a plurality of molds hinged to said support, means for swinging certain of said molds to and from the last, and means for moving certain other of the molds vertically relative to the last.

3. The combination with the frame, of a last, a support mounted on the frame, oppositely-moving side molds hinged to said support, a sole-mold also hinged to the support, and means for moving all of said molds toward and from the last.

4. The combination with the frame, and a last, of a forked post supported by the frame, and a mold movably connected to the forked portion of the post and adapted to be moved into and out of contact with a shoe on the last.

5. The combination with a frame, of a shoe-last, a support, oppositely-moving side molds, and a sole-mold movably connected to said support, and means for closing certain of said molds about a shoe upon the last at a relatively earlier time than certain other of the molds.

6. The combination with the frame, of a last, a supporting-post, oppositely-moving side molds and a sole-mold hinged to said supporting-post, and means for closing the side molds about a shoe upon the last at relatively earlier times than the sole-mold.

7. In a machine of the class described t e combination with a frame, of a shoe-support, a forked post, laterally-moving molds connected to said post and a vertically-moving mold connected to the forked portion of the post.

8. In a machine of the class described the combination with a frame and a shoe-support, of side molds and a top mold, a sliding cross-head, a motor for moving the same, a second sliding cross-head adjacent to the first-mentioned cross-head, means for imparting movement from the first-mentioned cross-head to the second, power-transmitting means between the first cross-head and the top mold, and power-transmitting means between the second cross-head and the side molds.

9. In a machine of the class described the combination with a frame, of a shoe-support thereon, a mold, and means for imparting movement to the mold comprising a reciprocating element, a rack connected thereto, a rotary member operated by said rack, and an eccentric-rod connecting the rotary member with the mold.

10. In a machine of the class described the combination with the frame and the shoe-support thereon, of a sole-mold, a motor, a reciprocating member operated by the motor, power-transmission means between the sole-mold and the reciprocating member whereby movement is imparted to such sole-mold, a plurality of oppositely-moving side molds, a reciprocating member operatively connected to said oppositely-moving side molds, and power-transmission means between the sole-mold-reciprocating member and the side-mold-reciprocating member whereby motion may be imparted from the sole-mold-reciprocating member to the side-mold-reciprocating member.

11. In a machine of the class described, the combination with the frame and a shoe-support thereon, of a sole-mold, a motor, a reciprocating member operated by the motor, power-transmission means between the sole-mold and the reciprocating member whereby movement is imparted to such sole-mold, a plurality of oppositely-moving side molds, a reciprocating member operatively connected to said oppositely-moving side molds, power-transmitting means between the first reciprocating member and the second reciprocating member whereby motion is imparted from the first reciprocating member to the second reciprocating member, and means for disengaging the last-mentioned power-transmitting means whereby the first-mentioned member may continue its movement forward while the second member remains stationary.

12. The combination with the frame and a shoe-support thereon, of a top mold and side molds, a reciprocating member, power-transmitting means connecting the reciprocating member with the top mold whereby movement is imparted to the latter, a second reciprocating member connected with the side molds, means for imparting movement from the first reciprocating member to the second reciprocating member to operate the side molds, means for disengaging the power-transmitting means between the two reciprocating members to permit the side molds to remain stationary while the top mold continues its movement, and means for opening the side molds with the retractive or opening movement of the top mold.

13. The combination with a frame and a shoe-support thereon, of a sole-mold and side mold, a motor, a reciprocating member connected to said motor, means interposed between the reciprocating member and the sole-mold for closing the sole-mold with a forward movement of the reciprocating member, a second reciprocating member connected to the side molds, means for imparting movement from the first reciprocating member to the second reciprocating member to close the side molds, and means for opening the side molds with the retractive movement of the first-mentioned reciprocating member.

14. The combination with the frame and a shoe-support thereon, of a plurality of oppositely-moving side molds, a reciprocating member, flexible connections between the reciprocating member and the side molds, a motor, and means interposed between the motor and the reciprocating member for imparting movement to the latter to open and close the side molds.

15. In a machine of the class described, a post, a last carried by one end of the post, and a cushion arranged beneath the opposite end of the post for cushioning the movement of the latter.

16. In a machine of the class described, a chamber, a supporting-post moving therein, a last carried by the upper end of said post, and means adjacent to the lower end of the post for cushioning the latter.

17. In a machine of the class described, a chamber, a post mounted to move therein and having a portion projected beyond the chamber, a last carried by that portion of the post outside the chamber, means for sustaining the post in an elevated position, and means for cushioning the post when depressed.

18. In a machine of the class described a shoe-support, means for raising and lowering the same, means for cushioning said support, a mold member adapted to depress said support against the cushion, and a motor for operating the mold member.

19. In a machine of the class described the combination with the molds and a shoe-support, of means adapted to sustain said support at a certain point of elevation, and a mold for depressing said support below such point of elevation against the action of the sustaining means.

20. In a machine of the class described the combination with a shoe-support, of resilient means adapted to sustain said support at a certain point of elevation, and a mold member for depressing said support below such point against the action of the resilient means.

21. In a machine of the class described the combination with side molds, and a shoe-support, of a sole-mold for forcing said shoe-support and its shoe into its final position in the side molds.

In testimony whereof I have signed my name to this specification in the presence of two subscribing witnesses.

MAURICE C. CLARK.

Witnesses:
R. B. CAVANAGH,
JOS. J. PIERANDO.